United States Patent
Chacon et al.

(10) Patent No.: US 9,205,522 B2
(45) Date of Patent: Dec. 8, 2015

(54) EQUIPMENT COMPRISING A ROTATABLE CRADLE AND INTENDED FOR ENCASING THE AIRFOIL OF A TURBINE BLADE IN ORDER TO MACHINE THE ROOT

(75) Inventors: Jose Chacon, Villeneuve la Garenne (FR); Jean-Jacques Michel Roussel, Fremainville (FR)

(73) Assignee: SNECMA, Paris (FR)

(*) Notice: Subject to any disclaimer, the term of this patent is extended or adjusted under 35 U.S.C. 154(b) by 334 days.

(21) Appl. No.: 13/824,777

(22) PCT Filed: Oct. 14, 2011

(86) PCT No.: PCT/FR2011/052411
§ 371 (c)(1),
(2), (4) Date: Mar. 18, 2013

(87) PCT Pub. No.: WO2012/052666
PCT Pub. Date: Apr. 26, 2012

(65) Prior Publication Data
US 2013/0174420 A1    Jul. 11, 2013

(30) Foreign Application Priority Data
Oct. 19, 2010    (FR) ...................................... 10 58506

(51) Int. Cl.
*B23Q 3/06*    (2006.01)
*F01D 25/28*    (2006.01)

(52) U.S. Cl.
CPC .............. *B23Q 3/063* (2013.01); *F01D 25/285* (2013.01); *Y10T 29/49336* (2015.01)

(58) Field of Classification Search
CPC ....... F01D 25/28; F01D 25/285; F01D 5/005; B23Q 3/063; Y10T 29/49336; Y10T 29/49318
See application file for complete search history.

(56) References Cited

U.S. PATENT DOCUMENTS

| | | | | |
|---|---|---|---|---|
| 2,540,774 | A * | 2/1951 | Beardsley | 451/6 |
| 4,737,417 | A * | 4/1988 | Mushardt et al. | 428/571 |
| 4,822,013 | A * | 4/1989 | Johnson | 269/7 |
| 4,841,117 | A * | 6/1989 | Koromzay | 219/76.1 |

(Continued)

FOREIGN PATENT DOCUMENTS

| | | |
|---|---|---|
| DE | 37 27 312 | 3/1989 |
| DE | 41 24 340 | 1/1993 |

(Continued)

OTHER PUBLICATIONS

International Search Report Issued Jan. 23, 2012 in PCT/FR11/52411 Filed Oct. 14, 2011.

*Primary Examiner* — Christopher M Koehler
(74) *Attorney, Agent, or Firm* — Oblon, McClelland, Maier & Neustadt, L.L.P.

(57) ABSTRACT

An equipment for coating an airfoil of a turbine blade of a turbine engine in a coating block, including a base on which a molding block is positioned for flow of the coating metal, the molding block including a cavity defining a reference plane on the block for positioning the block in space, wherein the base also includes a cradle supporting the blade via six bearing points defining an orientation plane representative of an angular position of the airfoil relative to a root of the blade. The cradle is rotatably movable relative to the base about an axis oriented so as to be substantially parallel to a direction of a leading edge of the blade, to enable a modification in an angle formed between the reference and orientation planes.

10 Claims, 3 Drawing Sheets

(56) References Cited

U.S. PATENT DOCUMENTS

| | | | |
|---|---|---|---|
| 2002/0166231 A1* | 11/2002 | Das et al. | 29/889 |
| 2006/0137169 A1* | 6/2006 | Boehm et al. | 29/557 |
| 2008/0271876 A1* | 11/2008 | Morin | 165/104.19 |
| 2009/0255307 A1* | 10/2009 | Davis et al. | 72/31.01 |
| 2012/0216402 A1* | 8/2012 | Krizansky et al. | 29/889.1 |
| 2013/0167337 A1* | 7/2013 | Dupouy et al. | 29/23.51 |

FOREIGN PATENT DOCUMENTS

| | | |
|---|---|---|
| SU | 553 083 | 5/1977 |
| SU | 619 321 | 7/1978 |

* cited by examiner

EQUIPMENT COMPRISING A ROTATABLE CRADLE AND INTENDED FOR ENCASING THE AIRFOIL OF A TURBINE BLADE IN ORDER TO MACHINE THE ROOT

BACKGROUND OF THE INVENTION

1. Field of the Invention

The present invention relates to the field of aeronautics and, more specifically, to the field of manufacturing turbine blades for turbomachines.

2. Description of the Related Art

Turbomachine blades generally consist of three parts: an upper part (or shroud), a middle part (or airfoil) and a lower part (or root), the upper and lower parts being separated from the airfoil by a platform. The airfoil is designed to be positioned in the gas flow in order to extract work through expansion of the gases in the flow, enabling it to drive the rotor of the turbomachine. An essential element in the production of a blade is ensuring the correct orientation of the airfoil relative to the root because, as the root is attached to a disk and is therefore immobile relative to the rotor of the turbomachine, this orientation determines the position of the airfoil in the flow of gases and, consequently, its aerodynamic efficiency.

The first stage in the manufacture of a blade is generally the creation of a casting which has the finished dimensions as regards the airfoil but is only a blank as regards the root and the shroud. The root and the shroud must then be machined to give them their definitive shape. Machining the root, in particular, is very important because it is this process which dictates the correct orientation of the airfoil relative to the flow of air. It is important to carry out this step of machining the root without increasing the uncertainty regarding the positioning of the airfoil relative to the root, in particular by avoiding excessive machining tolerances being added to the tolerances linked with the production of the airfoil.

Machining the root is traditionally carried out by positioning the blade in a known reference frame, connected with the machine tool, and embodied by six contact points which act as stops, against which the blade must press. A reference plane, oriented parallel to the direction of the leading edge of the blade and defining the orientation of the airfoil of the blade relative to a face of the root thereof the purpose of which is to come into contact with the slot of the disk on which the blade is to be mounted, is generally defined from these six points. The optimum aerodynamic efficiency of the airfoil is obtained if machining its root results in this reference plane of the blade corresponding to an ideal plane of orientation of the blade, also defined relative to the same face of the root.

Some of the points of the blade which are in contact with the stops are embodied by a reference point on the outer surface of the blade, which reference point is generated during forging or casting. The next step, which is essential for achieving correct positioning of the root relative to the airfoil, involves clamping the blade so that it does not move during machining of the root and so that the sides of the bulb or fir-tree shape of the root are correctly oriented. One of the difficulties associated with this operation is due to the three-dimensional shape of the airfoil which has no planar surface against which a perfectly braced pressure can be applied.

One known technique involves mechanically clamping the airfoil in a reference frame embodied by six points linked with the machine tool by pressing a gripping part against the airfoil. Once the airfoil has the correct orientation, i.e. once it has been rotated through what is referred to as a preselection angle which will impart to the airfoil the correct angle of attack in the flow of gases in the turbomachine, a face of the root which will act as a spatial reference for all subsequent steps is machined first of all. The following steps of machining the shape of the root and then the shape of the shroud are then carried out by positioning the machined face of the root against an appropriate reference frame which is defined on the machine tool.

First of all, this technique does not guarantee perfect stability during machining of the face of the root acting as the spatial reference because the pressure, which is generally provided at the center of the suction face of the airfoil, is limited by the fact that it acts in only one direction. The pressure which can be applied is also limited by the strength of the airfoil and by the strength of the skin which represents the thickness of this suction face. Without sufficient pressure, the airfoil can move during machining; excessive pressure, however, would result in the suction-face surface being marked, which could be accompanied by deformation of the profile of this suction face, which is relatively thin. This technique then accumulates uncertainties regarding the position of the elements to be machined, since first of all a reference frame linked to the airfoil is used when placing the latter on the machine tool, then the root is machined in a reference frame linked to the machine tool, and finally the shroud is machined in a reference frame linked to a face of the root.

Another frequently used technique involves embedding the airfoil, or at least a substantial portion thereof, in an encasing block made of a low-melting point material, such as an alloy of tin and bismuth. A face of the blade root is machined first of all. This face then serves as a spatial reference for positioning the blade in a six-point reference frame. The airfoil is then embedded in the encasing block of low-melting point material. Thus, the issue of precise positioning of the airfoil is becomes that of the positioning of the encasing block which is designed to have planar surfaces which will act as reference planes for the subsequent machining steps. After machining of the root and the shroud, the block is removed by melting and the blade regains its normal outer shape. However, this method still has the drawback of increasing the uncertainties in the positioning of the root by adding the tolerances resulting from placing the block around the airfoil to the tolerances of manufacturing the airfoil.

BRIEF SUMMARY OF THE INVENTION

The object of the present invention is to provide a solution to these drawbacks by proposing a method for defining a reference frame for the spatial positioning of a blade for machining the root thereof, which method does not involve the drawbacks of the prior art and, in particular, does away with the uncertainties caused by the changes in planes of reference used for machining the ends of said blade. The object of the invention is also to propose equipment allowing the root of a turbine blade to be machined using this method.

To that end, the invention relates to equipment for encasing the airfoil of a turbomachine blade in an encasing block, comprising a base on which a molding block is positioned for casting the encasing metal around said airfoil, said molding block comprising an imprint which defines a reference plane on the block acting as a support for positioning the block in space, said base further carrying a cradle for holding the blade by means of six contact points forming a reference frame for positioning said blade in space and defining what is referred to as an orientation plane which represents the angular position of the airfoil relative to the root of the blade, said reference planes and the orientation plane being oriented substantially parallel to the direction of the leading edge of the blade when the latter is positioned against said six contact points, characterized in that the cradle is able to move in rotation relative to said base about an axis oriented substantially parallel to the direction of the leading edge of the blade, so as to allow the angle formed between said reference and orientation planes to be changed.

The result is improved precision in positioning the airfoil of the blade in the flow of gases of the turbomachine, as the equipment makes it possible to use just one change of reference frame for positioning the airfoil in space, this being done directly from the six points of the blade toward a plane of the encasing block. Subsequently, machining the root and the shroud is carried out, for all the blades, from a same reference plane, which is that located on the encasing block.

In one particular embodiment, the cradle is formed of two elements positioned on either side of the molding block and connected rigidly to one another by a connection means.

More preferably, the contact points are distributed over the two elements.

The means for holding the blade are thus distributed further from each other, which represents an advantage for more stable holding of the blade.

Advantageously, the imprints of the molding block define two planes oriented substantially parallel to the direction taken by one of the lateral faces of the platform of the root of the blade in position on said equipment, each being able to serve as first reference plane.

Such a configuration makes the subsequent machining steps easier. Moreover, the volume of the encasing block is smaller; this reduced size provides for more flexibility for installing the equipment for machining the root and the shroud and therefore offers the possibility of carrying out both steps simultaneously.

The equipment preferably comprises a means for adjusting the angle of rotation of the cradle, the effective range of which is plus or minus 2°.

The invention also claims a method for encasing a turbomachine blade using a low-melting point metal for holding said blade during machining of its root and/or of its shroud, the airfoil of said blade having its finished dimensions, said root being in the state of a blank and having a face oriented substantially parallel to the direction of the leading edge of the blade, forming a spatial reference for the rotational position of the airfoil in space, said method comprising a step of measuring the preselection angle made by a plane referred to as an orientation plane which represents the rotational position of the airfoil in space, with the ideal orientation plane for said airfoil defined as giving the optimum orientation for the airfoil in the flow of gases of the turbomachine, the two planes being oriented substantially parallel to the direction of the leading edge of the blade and their orientations being defined in terms of angles relative to the face of said root which acts as spatial reference, said method further comprising a step of casting said low-melting point metal around said airfoil in a molding block to form an encasing block. It is characterized in that it comprises, before casting the low-melting point metal, a step of rotating said airfoil relative to the molding block through an angle equal to the measured preselection angle.

By means of the relative position given to the walls of the block relative to the airfoil, this rotation allows the airfoil to be oriented directly in the correct position for machining the facets of the root thereof, and also the shroud thereof.

In conclusion, the invention claims a method for producing a turbine blade comprising a step of encasing the airfoil thereof using the method as described above.

Advantageously, the above method provides that the root and the shroud are machined simultaneously on the same machine tool, the blade being held on said machine by means of the encasing block.

There is thus an appreciable time saving in the production of the turbine blades, with no loss of quality as regards the orientation of the airfoils relative to their ideal position in the flow of gases of the turbomachine.

BRIEF DESCRIPTION OF THE SEVERAL VIEWS OF THE DRAWINGS

The invention will be better understood, and other objects, details, features and advantages thereof will appear more clearly during the following purely illustrative and non-limiting detailed explanatory description of one embodiment of the invention, with reference to the attached schematic drawings.

In these drawings.

DETAILED DESCRIPTION OF THE INVENTION

Figure 1:
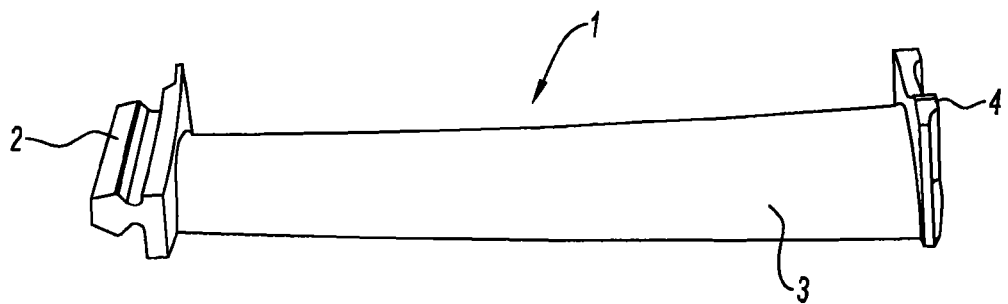
FIG. 1 is a perspective view of a turbine blade of a turbomachine in its raw as-cast state, before the machining of its root and shroud.

FIG. 1 shows a turbine blade 1 having, from bottom to top (i.e. from left to right in the figure), a root 2, an airfoil 3 and a shroud 4. The blade 1 is cast with its airfoil 3 having its finished dimensions, i.e. one which needs no further shaping, whereas the root 2 and the shroud 4 are blanks which need to be machined in order to have their final shape. In particular, the precise orientation of the root relative to the airfoil must be defined during this machining, by means of rotation, relative to a current flank of the root, by a preselection angle which can vary by +/−2°, in order to obtain the best possible aerodynamic performance for the blade. The shroud will then be machined to give, in a known manner, sealing lips.

Figure 2:
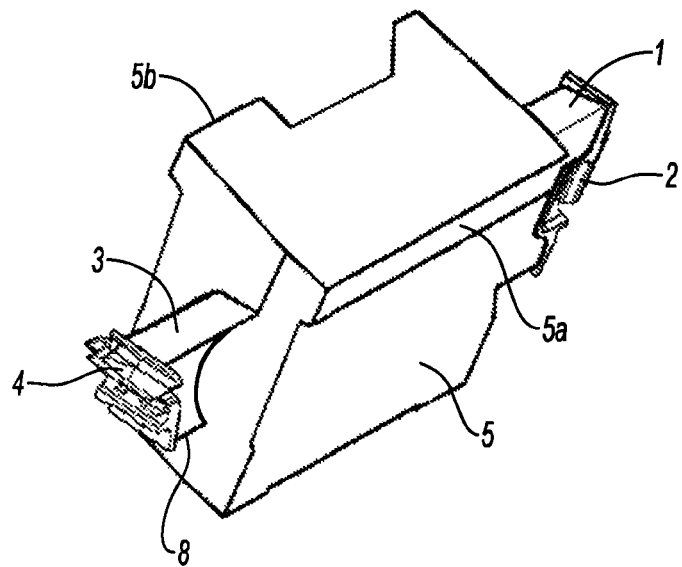
FIG. 2 is a perspective view of a turbine blade embedded in an encasing block.

FIG. 2 shows a blade 1 imprisoned in an encasing block 5, with the majority of its airfoil 3 embedded in the low-melting point metal, while the root 2 and the shroud 4 are free and can be fashioned by a machine tool. The encasing block 5 has parallel planes 5a, 5b which extend substantially parallel to the leading edge 8 and which have precise angular orientations, relative to the orientation of the airfoil, so as to serve as reference plane for positioning the airfoil in space, during installation thereof on a machine tool.

Figure 3:
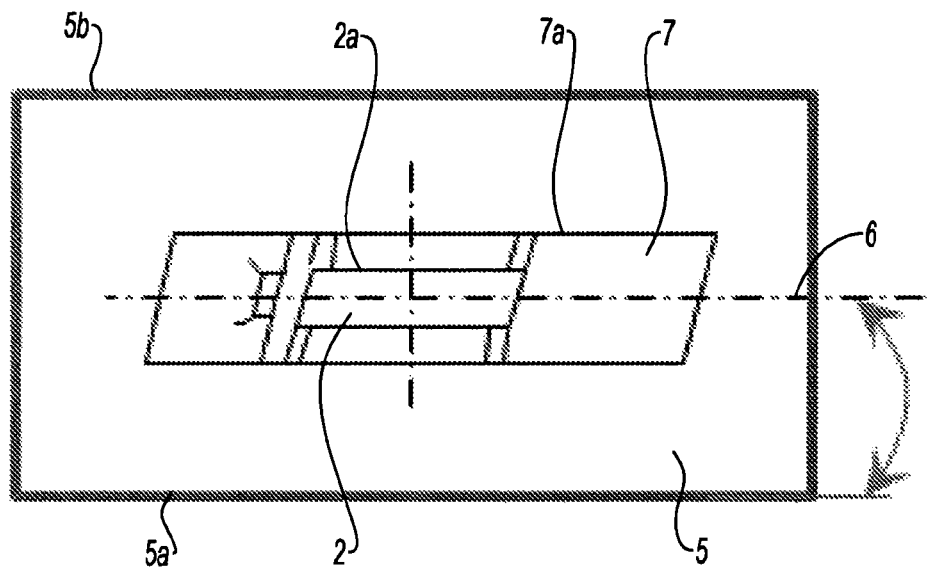
FIG. 3 is a view from below of the encased turbine blade of FIG. 2.

FIG. 3 also shows the blade 1, seen from below, embedded in the block 5, with its root 2 and the platform 7 delimiting the root. The block 5 is shown here in the form of a right-angled parallelepiped with two parallel faces 5a, 5b, at least one of which will act as a plane of reference during machining of the ends of the blade. These two faces are positioned substantially parallel to two of the lateral faces of the platform 7 of the blade root.

In parallel, the airfoil 3 has what is referred to as an orientation plane 6, oriented parallel to the direction of the leading edge 8 of the blade, which in this case corresponds substantially to the central surface of the airfoil, and which is defined precisely in relation to the six reference points of the blade which define the position of the airfoil thereof in space. The orientation of this plane 6 relative to a flank 2a of the root 2, or of a lateral face 7a of the platform 7 thereof, which is thus taken as that face of the root which acts as a spatial reference from which the rotational position of the blade in space is defined, controls the angle of attack which the airfoil of the blade will have relative to the flow of gases when the blade is installed in the turbomachine. As mentioned before, the optimum aerodynamic efficiency of the airfoil is obtained if machining its root results in the plane of orientation of the airfoil corresponding to an ideal plane of orientation of the airfoil. This ideal plane, also defined relative to a face of the platform 7 or a flank of the root 2 of the blade, is supplied by the company's design department. Controlling the angle that the plane of face 5a or 5b of the encasing block 5 makes with the plane of orientation 6 of the airfoil is precisely the object of the invention. It is shown as equal to zero in FIG. 3.

Figure 4:
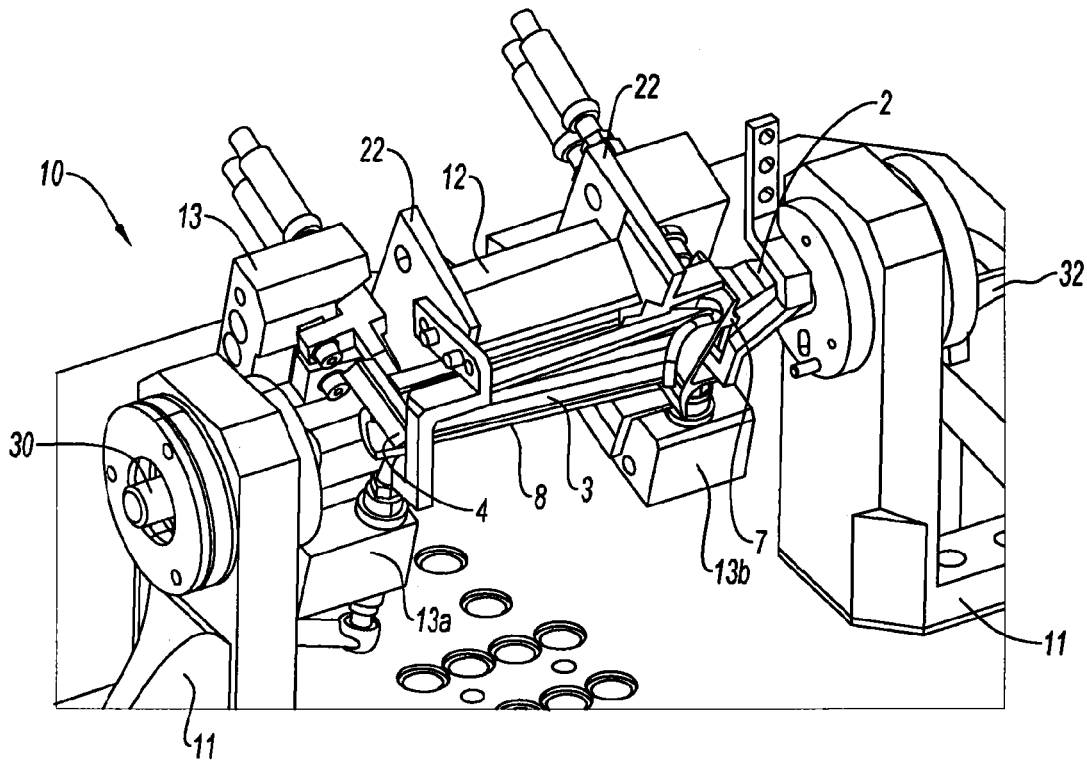
FIG. 4 is a perspective view of part of a piece of equipment for encasing a turbine blade, according to one embodiment of the invention.

Referring now to FIG. 4, this figure shows the main pieces of equipment 10 for the purpose of casting the encasing block 5 onto the airfoil 3 of the blade 1. This equipment 10 essentially consists of three parts: a base 11 fixed to the floor, a molding block 12 which is also fixed and borne rigidly by the base 11, and a cradle 13 borne by the base 11 and able to rotate about a horizontal spindle 30 relative to this base 11 and to the molding block 12. The equipment 10 here carries a blade 1 which can be seen in the cradle 13. This blade is arranged with its leading edge 8 in a substantially horizontal position, parallel to the spindle axis 30.

The molding block 12 is positioned between two elements 13a and 13b of the cradle, which grip it and which are connected to one another by a rigid connection means, located behind the equipment 10. This is a conventional mold for casting a low-melting point metal around an airfoil having, in the first instance, an imprint designed to produce the parallel faces 5a and 5b of the block 5 with high precision as regards the orientation thereof and, in the second instance, a casting aperture located in the upper portion (not shown) and two plates 22 located on either side of the molding block, between the molding block 12 and the two elements of the moveable cradle 13, so as to contain the liquid metal during pouring and to limit the extent of the block 5 along the airfoil 3. The molding block is shown here only in part, a complementary part being placed in front of the airfoil 2 of the blade in order to encase it completely during pouring.

The cradle 13 can rotate about the horizontal spindle 30, which is borne by two bearings held by the base 11. An adjusting means 32 adjusts the rotation of the cradle 13 and, as a result, the angular position of the cradle relative to the base 11, and hence relative to the molding block 12, can be known and adjusted. It is this means that allows the preselection angle, i.e. specifically the desired angle of separation there is to be between the plane of orientation 6 and the planes of the faces 5a and 5b of the encasing block, to be set.

Figure 5:
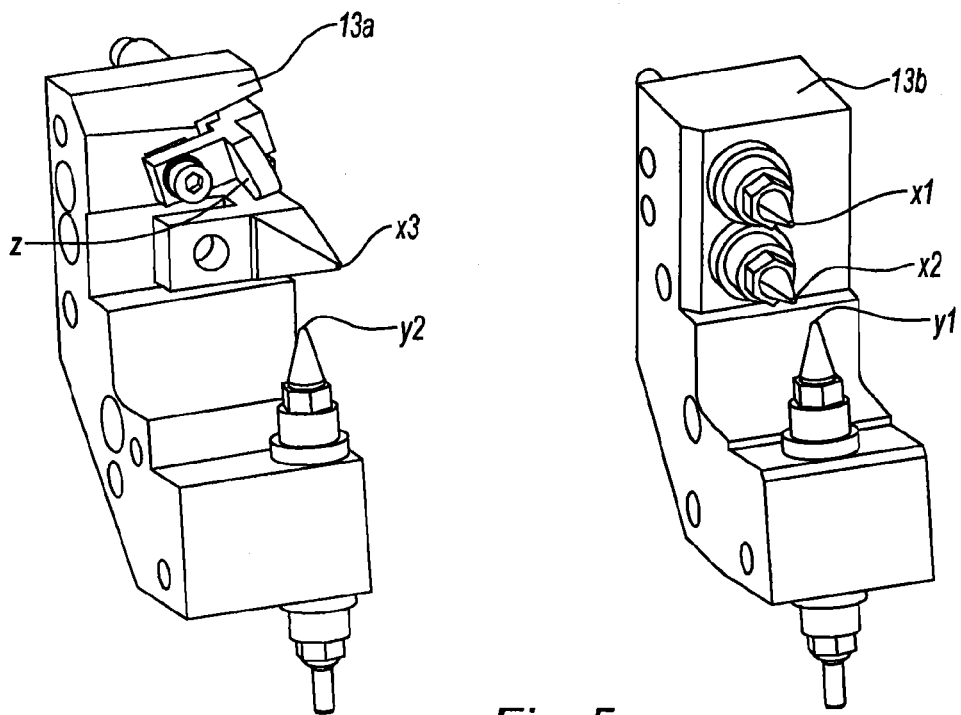
FIG. 5 is a detail view of FIG. 4, showing one particular element of the encasing equipment.

FIG. 5 shows the moveable cradle 13 on its own, without the blade 1. It has six contact points for holding a blade at the level of the six reference points thereof for positioning it in space. Five contact points X1, X2, X3, Y1 and Y2 define precisely the spatial position that the airfoil 2 must have when the low-melting point metal is poured and, in particular, the orientation of its plane of orientation 6 in the rotation about the spindle 30. A sixth point Z defines the longitudinal position of the airfoil on the spindle 30 by cooperation with the shroud 4 of the blade; an uncertainty regarding the position of the airfoil on this spindle has no negative consequences, as it results in the end in a simple longitudinal offset of the block 5 on the airfoil 3.

Figure 6:
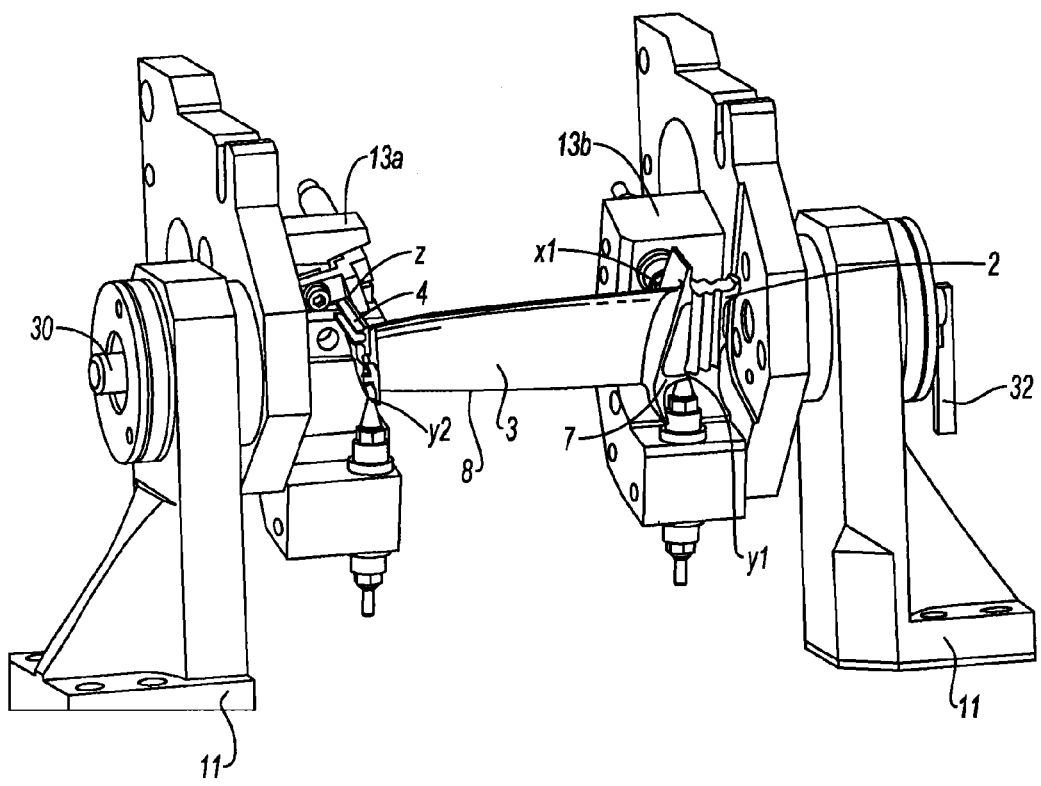
FIG. 6 is a second perspective representation of the part of the encasing equipment of FIG. 4.

FIG. 6 shows the equipment of FIG. 4 without the encasing block so that the position of the blade 1 is apparent, with four contact points in position against four of the six reference points for positioning the blade in space, the last two not being visible.

There follows a description of the process for mounting and then encasing a blade 1 in a block 5 on a pouring equipment 10 in accordance with one embodiment of the invention.

The as-cast blade 1 is analyzed during its quality control after the casting step, during which quality control its orientation with respect to a lateral face of the as-cast platform 7 is checked. The angular measurement carried out makes it possible to define by what angle the root 2 must be offset by adjusting the orientation of the flanks thereof or of the lateral faces of the platform 7 during machining thereof, so that the airfoil 3 is correctly oriented in the flow of gases of the turbomachine. The preselection angle is equal to the angle between the plane of orientation 6 and the ideal plane of orientation of the airfoil in space, i.e. that which would give the latter an ideal orientation in the flow of gases. This preselection angle is then measured, as in the prior art, by comparing the orientation of one of the lateral faces 7a of the platform 7 or of a flank 2a of the root 2 of the blade, with the ideal orientation which is defined in connection with the six reference points of the blade for positioning the blade in space.

Once this angle is known, the blade is positioned in the cradle by aligning its six positioning reference points against the six contact points X1, X2, X3, Y1, Y2 and Z of the cradle 13. By using the adjustment means 32, the operative causes the cradle 13 to rotate on its spindle 30, relative to the base 11, by an angle equal to the previously measured preselection angle, and in a direction which corrects the observed angular offset.

The operative then pours low-melting point metal, in the liquid phase, into the molding block 12 through the casting aperture. The metal spreads around the airfoil 3 of the blade, within the limit allowed by the internal imprints of the mold and by the two lateral plates 22. Once the encasing block 5 has solidified, the encased blade is removed from the equipment 10 and is ready to be mounted in a machine tool for machining its root 2 and shroud 4. Once the preselection angle has been corrected by the rotation performed on the airfoil before encasing, the faces 5a and 5b of the block are correctly oriented relative to the plane of orientation 6 of the airfoil; they will then be able to serve as positioning reference for the airfoil and therefore as reference for positioning the block in the machine tool.

There is no longer any need to transfer the reference of the airfoil 3 onto one of the lateral faces of the platform 7 in order to position the blade before machining the root 2 thereof, or to wait for machining of the root to be complete to use this as reference for machining the shroud 4. It is thus possible to machine these two ends simultaneously by placing the encased blade in a machine tool comprising, for example, twin grinding wheels.

The position of the airfoil of the blade being thus correctly defined right from the casting of the block (5), there is no longer any need to change the settings of the machine tools when changing from one blade to the next, as long as the roots of one and the same type of blade are being machined.

An appreciable time saving in the production of a turbine blade is thus achieved, as well as better positioning thanks to the reduction in the number of successive transfers of reference frame.

The invention claimed is:

1. An equipment for encasing an airfoil of a turbomachine blade in an encasing block, comprising:
   a base on which a molding block is positioned for casting an encasing material around the airfoil,
   the molding block rigidly fixed to the base and comprising an imprint that defines a reference plane on the block acting as a support for positioning the block in space,
   a cradle which holds the blade by six contact points forming a reference frame for positioning the blade in space and defining an orientation plane that represents an angular position of the airfoil relative to a root of the blade, the reference planes and the orientation plane being oriented substantially parallel to the direction of a leading edge of the blade when the blade is positioned against the six contact points;
   wherein the cradle is configured to move in rotation relative to the base and relative to the molding block about a spindle oriented substantially parallel to the direction of the leading edge of the blade, to allow an angle formed between the reference and orientation planes to be changed.

2. The equipment as claimed in claim 1, wherein the cradle includes first and second elements positioned on either side of the molding block and connected rigidly to one another.

3. The equipment as claimed in claim 2, wherein the contact points are distributed over the first and second elements.

4. The equipment as claimed in claim 3, wherein the first element includes three contact points, and the second element includes three contact points, and one of the contact points of the first element defines a longitudinal position of the airfoil on the spindle.

5. A method for encasing a turbomachine blade using a meltable material for holding the blade during machining of at least one of a root or a shroud of the blade, an airfoil of the blade having its finished dimensions, the root including a face oriented substantially parallel to a direction of a leading edge of the blade, forming a spatial reference for a rotational position of the airfoil in space, the method comprising:
   measuring a preselection angle made by a plane as an orientation plane which represents a rotational position of the airfoil in space, with an ideal orientation plane for the airfoil defined as giving optimum orientation for the airfoil in a flow of gases of the turbomachine, the two orientation planes being oriented substantially parallel to the direction of the leading edge of the blade and their orientations being defined relative to the face of the root which forms the spatial reference;
   positioning the blade in a cradle such that the cradle holds the blade by six contact points defining the orientation plane;
   positioning a molding block which is fixed to a base;
   rotating the airfoil relative to the base and to the molding block through an angle equal to the measured preselection angle; and
   casting the meltable material around the airfoil in the molding block to form an encasing block.

6. The equipment as claimed in claim 1, wherein imprints of the molding block define two planes oriented substantially parallel to the direction taken by one of lateral faces of a platform of the root of the blade in position on the equipment, each configured to serve as first reference plane.

7. The equipment as claimed in claim 1, further comprising an adjusting device which adjusts an angle of rotation of the cradle, an effective range of which is plus or minus 2°.

8. The method as claimed in claim 5, wherein in the meltable material is a metal.

9. A method for producing a turbine blade comprising encasing the airfoil thereof using the method as claimed in claim 5.

10. The method as claimed in claim 9, wherein the root and the shroud are machined simultaneously on a same machine tool, the blade being held on the machine tool by the encasing block.

* * * * *